Figure 1:
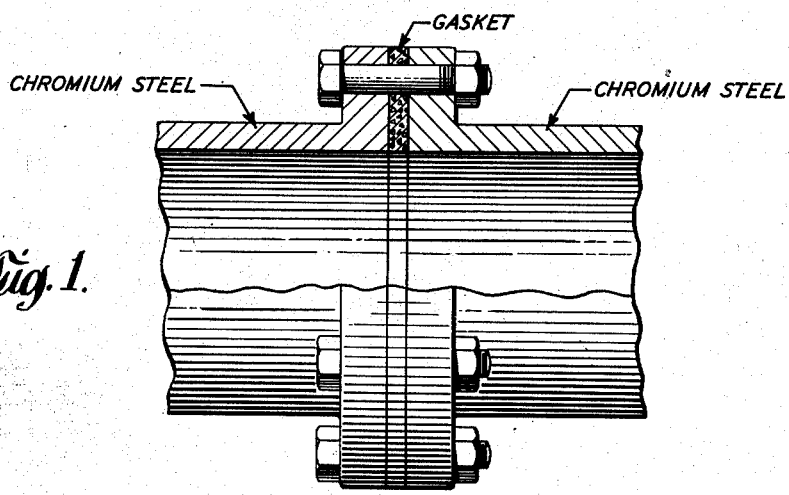

Oct. 27, 1942.                R. FRANKS                 2,299,813
                            GASKETED JOINT
                          Filed Nov. 13, 1940

INVENTOR
RUSSELL FRANKS
BY
ATTORNEY

Patented Oct. 27, 1942

2,299,813

UNITED STATES PATENT OFFICE 2,299,813

GASKETED JOINT

Russell Franks, Niagara Falls, N. Y., assignor to Electro Metallurgical Company, a corporation of West Virginia Application November 13, 1940, Serial No. 365,465

5 Claims. (Cl. 285—139)

This invention relates to gaskets and refers more particularly to gaskets for use in contact with corrosion-resistant chromium steels.

Steels containing between about 4% and 30% chromium are widely used for resistance to corrosion in industrial applications. Steels of this type frequently contain 5% to 35% nickel or manganese or both, and sometimes small proportions of molybdenum, or columbium, or titanium, or two or three of these metals, are also present to enhance the corrosion resistance or otherwise improve the properties of such steels.

It is often desirable or convenient to seal by a gasket a joint between members composed of such steel both in applications where high pressures may be encountered, for example between tubes or between tubes and headers, and in applications where no substantial pressures are met, for instance between a container and its cover. Gaskets for these uses are quite frequently made of natural or synthetic rubber or asbestos.

When a joint comprising two members of steel of the kind described, sealed by a rubber or asbestos gasket, is subjected to corrosive media of the type which the steel ordinarily withstands, the steel surfaces in contact with the gasket are often locally attacked. As a result of this attack, the joint becomes leaky and must be dismantled to permit refinishing of the steel surfaces or replacement of the steel members. It is particularly inconvenient that this should be so because the deterioration at the joint takes place usually long before the other parts of the structure have served their normal periods of usefulness.

It is an object of the present invention to provide a gasket which may be used in contact with high chromium steels under corrosive conditions without the danger of corrosive attack of the steel surfaces with which it is in contact.

The invention, by means of which this object is achieved, is based on the discovery that the local attack of chromium steels encountered at the surfaces of such steels adjacent a gasket is decreased or substantially eliminated when a gasket having sealing surfaces consisting predominantly of low carbon ferrochromium (which term, as herein applied, means ferrochromium containing less than about 2% carbon) is used. The invention is, accordingly, a gasket for use in contact with high chromium steels and having sealing surfaces containing low carbon ferrochromium. The invention also comprises a gasketed joint comprising adjacent surfaces of chromium steel and a gasket of the kind described therebetween.

The invention will be described with reference to the accompanying drawing, in which:

Fig. 1 is a side elevation, partly in section, of a gasketed joint; and

Figs. 2 to 5, inclusive, are sectional views of types of gaskets embodying the invention, as hereinafter described.

In accordance with the invention, a gasket for use in contact with high chromium steels under corrosive conditions may comprise any suitable gasket material, such as rubber or asbestos, having sealing surfaces consisting principally of low carbon ferrochromium. For example, a rubber gasket material coated with low carbon ferrochromium may be prepared by mixing powdered low carbon ferrochromium with rubber cement and painting the mixture onto the surfaces of the rubber. More suitably, to avoid the possibility of completely covering the particles of ferrochromium with rubber cement, the cement is applied to the rubber, and before it has dried, the ferrochromium is sprinkled onto it in an even layer, or the rubber surface can be impregnated under pressure with powdered low carbon ferrochromium.

Another, and preferred, embodiment of the invention is a gasket having sealing surfaces consisting of powdered low carbon ferrochromium bonded by a soft metal such as lead, zinc, copper, tin, nickel, or cobalt. The most suitable bonding metal of this group for most conditions of use is lead, but under unusual conditions of temperature and corrosion it may be desirable to use a different metal of this group.

A gasket of the kind having sealing surfaces of powdered ferrochromium bonded with lead may be made by forcing powdered low carbon ferrochromium into a sheet of lead or, preferably, by preparing a mixture of powdered lead and powdered low carbon ferrochromium and subjecting the mixture to pressure to form a sheet. The material so prepared can easily be cut to the desired shape. The latter method makes possible the production of gaskets having smooth surfaces and also insures even distribution of the ferrochromium.

In preparing gaskets of the kind just described, the quantity of bonding metal used should be just sufficient to bond the ferrochromium, the proportion of bonding metal to ferrochromium being as low as possible consistent with the formation of a good bond. In the case of a gasket having a lead base, it has been found particularly desirable to use about one part of lead for every three parts of ferrochromium.

Figure 2:
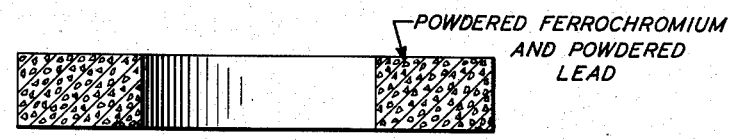

Referring to the drawing, there is shown in Fig. 1 a gasketed joint consisting of two flanged chromium steel tubes and a gasket embodying the invention therebetween and in contact therewith. Fig. 2 is a sectional view of a typical gasket, composed of a mixture of powdered ferrochromium and powdered lead bonded together under pressure.

Figure 3:
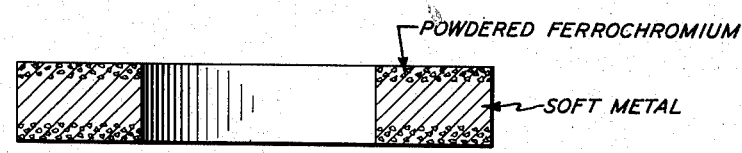
Figure 4:
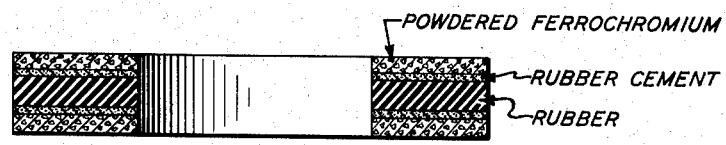
Figure 5:
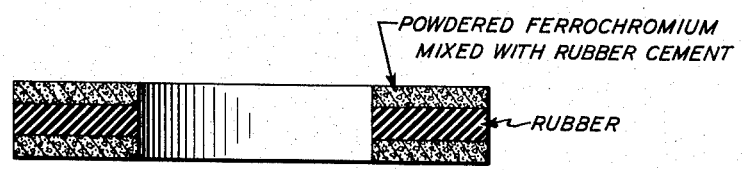

Other examples of gaskets embodying the invention, illustrated in section in Figs. 3 to 5, inclusive, comprise for instance a soft metal base coated with powdered ferrochromium pressed into the soft metal (Fig. 3), or a rubber base having powdered ferrochromium surfaces bonded to it by a layer of rubber cement (Fig. 4); or a rubber base coated with a mixture of powdered ferrochromium and rubber cement (Fig. 5).

Tests of the gaskets of the invention have been made in which a joint comprising two stainless steel members of the 18% chromium—8% nickel type in contact with the surfaces of a gasket were immersed in 4% sodium chloride solution at room temperature. In such tests, the surfaces of the steel in contact with lead-base gaskets having sealing surfaces of low carbon ferrochromium showed no signs of corrosion after two months. Similar results were obtained with the use of rubber gaskets coated with low carbon ferrochromium. When joints of the same type of steel in contact with gaskets of the ordinary kind were subjected to the same test conditions, all showed severe attack on the surfaces in contact with the gaskets when examined after forty-seven days.

The specific examples of the invention given herein are by way of illustration merely, and the invention is not limited to or by such examples.

I claim:

1. A gasketed joint comprising adjacent surfaces of chromium steel and a gasket therebetween, said gasket having sealing surfaces consisting principally of low carbon ferrochromium.

2. A gasketed joint comprising adjacent surfaces of chromium steel and a gasket therebetween, said gasket comprising a deformable base material and sealing surfaces consisting principally of comminuted low carbon ferrochromium.

3. A gasketed joint comprising adjacent surfaces of chromium steel and a gasket therebetween, said gasket comprising a rubber base coated with comminuted low carbon ferrochromium.

4. A gasketed joint comprising adjacent surfaces of chromium steel and a gasket therebetween, said gasket having sealing surfaces composed of comminuted low carbon ferrochromium bonded with a soft metal.

5. A gasketed joint comprising adjacent surfaces of chromium steel and a gasket therebetween, said gasket consisting of powdered low carbon ferrochromium bonded with lead.

RUSSELL FRANKS.